United States Patent
Thiebaut et al.

(10) Patent No.: US 10,694,350 B2
(45) Date of Patent: Jun. 23, 2020

(54) SUPPORT OF MOBILE-TERMINATED APPLICATION SERVICES IN A MOBILE SYSTEM

(71) Applicant: Alcatel Lucent, Boulogne Billancourt (FR)

(72) Inventors: Laurent Thiebaut, Nozay (FR); Michael Francis Dolan, Naperville, IL (US); Omar Elloumi, Nozay (FR)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/514,269

(22) PCT Filed: Sep. 18, 2015

(86) PCT No.: PCT/EP2015/071508
§ 371 (c)(1),
(2) Date: Mar. 24, 2017

(87) PCT Pub. No.: WO2016/046096
PCT Pub. Date: Mar. 31, 2016

(65) Prior Publication Data
US 2017/0238121 A1    Aug. 17, 2017

(30) Foreign Application Priority Data
Sep. 26, 2014    (EP) .................................... 14306497

(51) Int. Cl.
*H04W 68/00*    (2009.01)
*H04W 4/50*    (2018.01)
(Continued)

(52) U.S. Cl.
CPC ............... *H04W 4/50* (2018.02); *H04W 4/70* (2018.02); *H04W 8/10* (2013.01); *H04W 8/18* (2013.01); *H04W 60/04* (2013.01); *H04W 76/19* (2018.02)

(58) Field of Classification Search
CPC .... H04M 3/527; H04M 3/42382; H04M 3/42; H04W 4/14; H04W 4/12; H04W 92/24
(Continued)

(56) References Cited

U.S. PATENT DOCUMENTS

2010/0261490 A1* 10/2010 Berry ...................... H04W 4/12
455/466
2012/0155404 A1    6/2012 Shin et al.
(Continued)

FOREIGN PATENT DOCUMENTS

| CN | 103283301 A | 9/2013 |
| CN | 103379593 A | 10/2013 |
| JP | 2012-156975 A | 8/2012 |

OTHER PUBLICATIONS

English Bibliography for Japanese Patent Application Publication No. JP 2012-156975, publish Aug. 16, 2012, printed from Derwent Innovation on Jul. 30, 2018. 6 pp.
(Continued)

*Primary Examiner* — Dai Phuong
(74) *Attorney, Agent, or Firm* — Fay Sharpe LLP

(57) ABSTRACT

A method for support of mobile-terminated application services in a mobile system is provided. The method is based on a User Equipment UE subscription The method includes enabling triggering of at least one network Application associated with a given of one or more subscribed Access Point Name APN, upon said UE being reachable again after failure of a mobile network procedure to reach said UE via a Packet Data Network PDN connection established for said UE and said APN. A Home Subscriber Server HSS associated with the method is also provided. A Mobility Management Server MME, or a Serving GPRS Support Node SGSN associated with the method is also provided.

14 Claims, 2 Drawing Sheets

Figure 1:
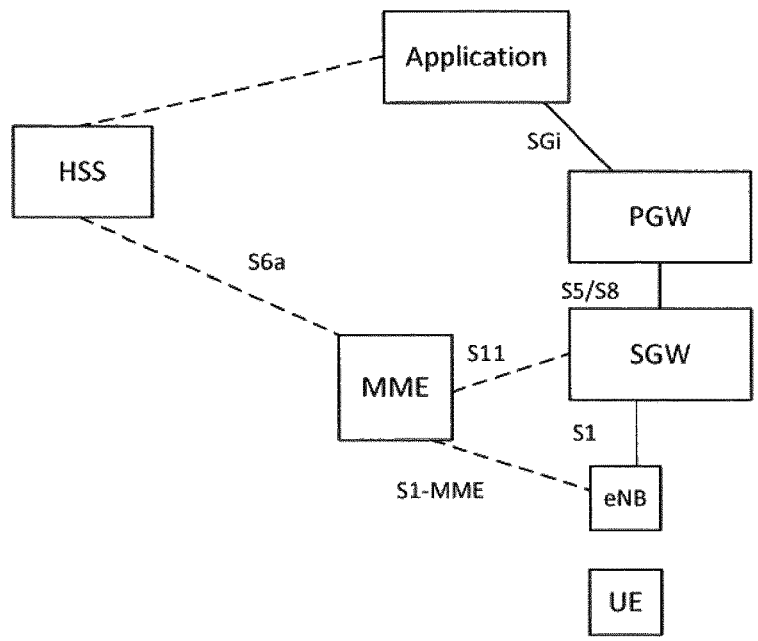

(51) Int. Cl.
*H04W 4/70* (2018.01)
*H04W 76/19* (2018.01)
*H04W 8/10* (2009.01)
*H04W 8/18* (2009.01)
*H04W 60/04* (2009.01)

(58) Field of Classification Search
USPC .............. 455/432.1, 433, 435.1, 435.2, 466
See application file for complete search history.

(56) References Cited

U.S. PATENT DOCUMENTS

| | | | |
|---|---|---|---|
| 2013/0005387 A1* | 1/2013 | Aso | H04W 4/70 455/517 |
| 2013/0279420 A1 | 10/2013 | Nishida et al. | |
| 2013/0279421 A1 | 10/2013 | Nishida et al. | |
| 2014/0031069 A1 | 1/2014 | Yang et al. | |
| 2014/0219178 A1* | 8/2014 | Lopez | H04W 12/08 370/328 |
| 2015/0109966 A1* | 4/2015 | Hong | H04W 4/14 370/259 |
| 2015/0117285 A1 | 4/2015 | Xie et al. | |
| 2015/0119092 A1* | 4/2015 | Yi | H04W 4/70 455/466 |
| 2016/0073308 A1* | 3/2016 | Okabe | H04W 36/12 370/331 |
| 2016/0373921 A9* | 12/2016 | Garcia Azorero | H04W 4/70 |
| 2017/0230817 A1* | 8/2017 | Ryu | H04W 8/02 |
| 2018/0176838 A1* | 6/2018 | Okabe | H04W 36/12 |
| 2019/0075544 A1* | 3/2019 | Nishida | H04W 76/34 |
| 2019/0159077 A1* | 5/2019 | Ryu | H04W 8/04 |

OTHER PUBLICATIONS

S2-091799, Reply LS on SMS procedures for E-UTRAN, 3GPP TSG-SA WG2 Meeting #72, Hangzhou, China, Mar. 30-Apr. 3, 2009, 14 pp.

S2-121847, Overall Corrections, NTT Docsmo et al., 3GPP TSG-SA2 Meeting #90, Change Request sheet, Bratislava, Slovakia, Apr. 16-20, 2012, 15 pp.

PCT Pat. App. No. PCT/EP2015/071508, Written Opinion of the International Searching Authority, dated Nov. 6, 2015, 5 pp.

European Pat. App. No. 14306497.0, Extended European Search Report, dated Mar. 12, 2015, 6 pp.

Alcatel-Lucent, "Pseudo-CR on Avoiding multiple reattachments to EPC," 3$^{rd}$ Generation Partnership Project (3GPP), 3GPP TSG CT4 Meeting #51bis, C4-110056, 6 pages, XP050475629, Ljubljana, Slovenia, Jan. 24-28, 2011.

International Search Report for PCT/EP2015/071508 dated Nov. 6, 2015.

English Bibliography of Chinese Patent Application Publication No. CN103283301A, Published on Sep. 4, 2013, Printed from Derwent Innovation on Sep. 4, 2019, 6 pages.

English Bibliography of Chinese Patent Application Publication No. CN103379593A, Published on Oct. 30, 2013, Printed from Derwent Innovation on Sep. 4, 2019, 5 pages.

TD 52-111459, Evaluation for MTC devices triggering, 3GPP TSG SA WG2 Meeting #84, Apr. 11-15, 2011, Bratislava, Slovakia, 8 pages.

* cited by examiner

SUPPORT OF MOBILE-TERMINATED APPLICATION SERVICES IN A MOBILE SYSTEM

The present invention generally relates to mobile communication networks and systems.

Descriptions of mobile networks and systems can be found in the literature, such as in particular in Technical Specifications published by standardization bodies such as for example 3GPP ($3^{rd}$ Generation Partnership Project).

An example of mobile system is EPS (Evolved Packet System). An EPS network comprises a Core Network called EPC (Evolved Packet Core) that can be accessed via E-UTRAN (LTE case) or via GERAN/UTRAN (2G/3G case). EPS is specified in particular in 3GPP TS 23.401 for E-UTRAN access and in 3GPP TS 23.060 for GERAN/UTRAN access.

In a system such as EPS, a User Equipment (UE) has access to application services from at least one application (also referred to in the following as network application) in at least one external network (also referred to as Packet Data Network PDN), via an EPS network providing communication services. These communication services include providing connectivity (referred to as PDN connectivity, or IP connectivity) between the UE and a PDN represented by an Access Point Name APN.

Embodiments of the present invention more particularly relate to the support of mobile-terminated application services in a system such as for example EPS. An example of mobile-terminated application services is device triggering, defined in particular in 3GPP TS 23.682 specifying architectural enhancements to facilitate communications with packet data networks and applications.

An example of applications is Machine Type Communication (MTC) applications. The end-to-end communication between the MTC Application in the UE and the MTC Application in the external network uses services provided by a 3GPP system, and optionally services provided by a Services Capability Server (SCS). The MTC Application in the external network is typically hosted by an Application Server (AS) and may make use of an SCS for additional value added services. The 3GPP system provides transport, subscriber management and other communication services including various architectural enhancements motivated by, but not restricted to, MTC (e.g. device triggering).

Device triggering is defined in 3GPP TS 23.682 as a mechanism by which a SCS sends information to the UE via the 3GPP network to trigger the UE to perform specific actions that include initiating communications with the SCS or an AS.

A Power Saving Mode (PSM) is also defined in 3GPP TS 23. 682. A UE may adopt the PSM for reducing its power consumption. That mode is similar to power-off, but the UE remains registered with the network and there is no need to re-attach or re-establish PDN connections. A UE in PSM is not immediately reachable for mobile terminating services. A UE using PSM is available for mobile terminating services only for the period of an Active Time after a mobile originated event like data transfer or signalling, e.g. after a periodic TAU/RAU (Tracking Area Update/Routing Area Update) procedure. Applications that want to use the PSM need to consider specific handling of mobile terminated services or data transfers.

As recognized by the inventors, and as will be explained with more detail later, there is a need for an improved support of mobile-terminated application services (such as Device Triggering) especially (though not exclusively) towards an UE in Power Saving Mode.

Embodiments of the present invention in particular address such needs.

These and other objects are achieved, in one aspect, by a method for support of mobile-terminated application services in a mobile system, said method comprising:

based on a User Equipment UE subscription, enabling, for one or more subscribed Access Point Name APN, triggering of at least one network Application associated with a given of said one or more APN, upon said UE being reachable again after failure of a mobile network procedure to reach said UE via a Packet Data Network PDN connection established for said UE and said APN (such as after Downlink Data Notification failure in an EPS network).

These and other objects are achieved, in other aspects, by entities configured for performing at least one of the steps of such method, said entities including, in particular (though not exclusively): mobile network subscriber database (such as Home Subscriber Server HSS), mobile Core Network nodes capable of serving the UE in a mobile network (such as Mobility Management Entity MME or Serving GPRS Support Node SGSN), network. Application, Operation and Maintenance (OAM) entity.

Figure 2:
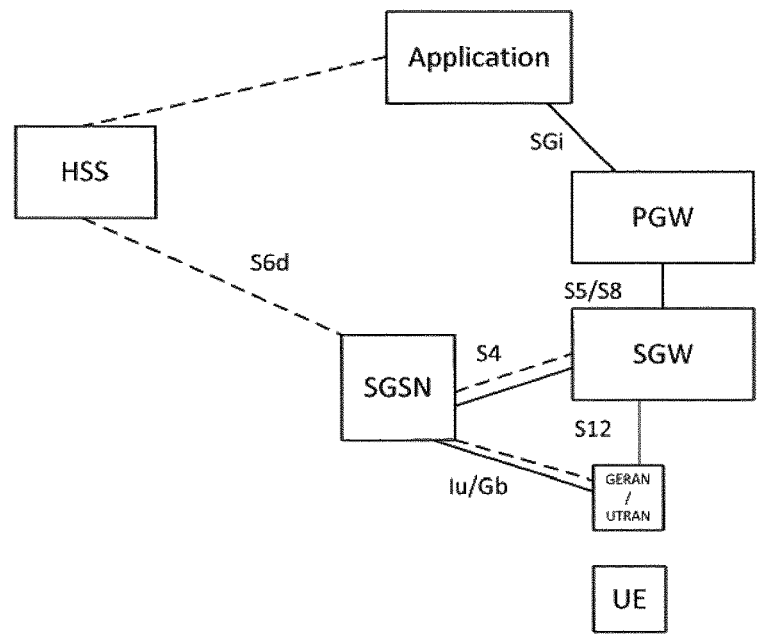
Figure 3:
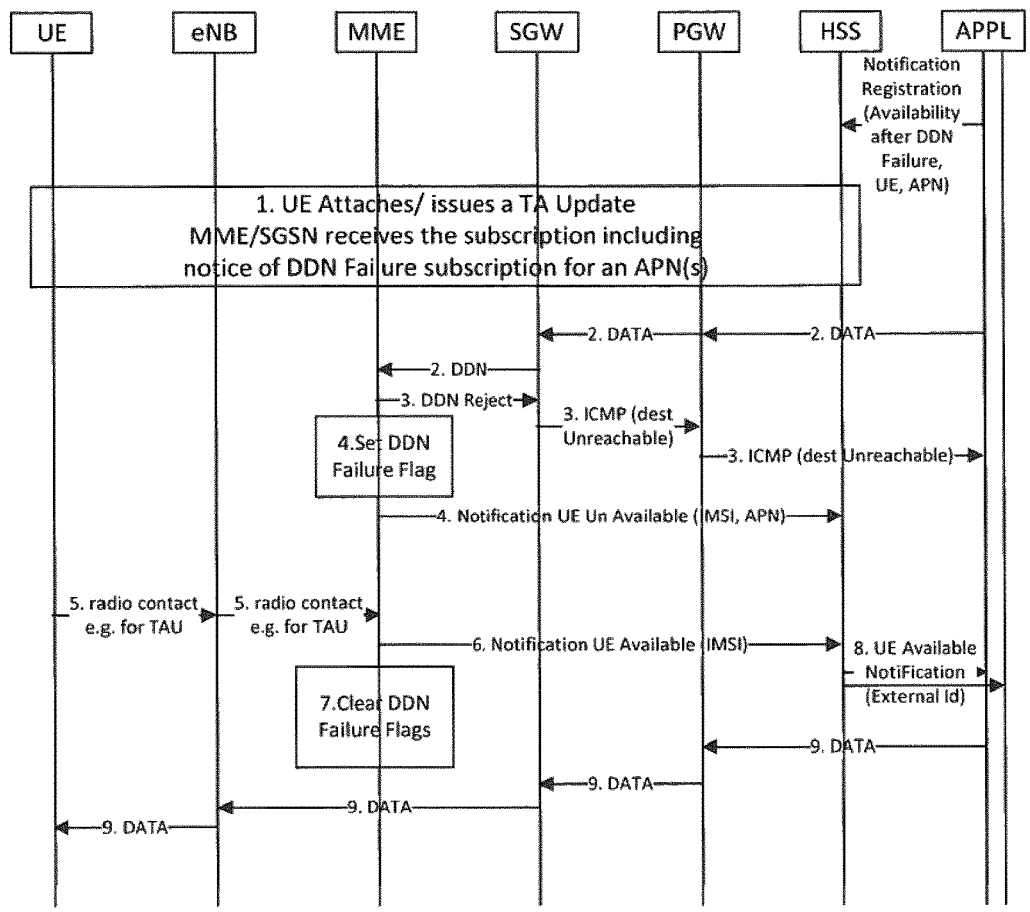

Some embodiments of apparatus and/or methods in accordance with embodiments of the present invention are now described, by way of example only, and with reference to the accompanying drawings, in which:

FIG. 1 is intended to illustrate an example of EPS architecture (LIE case), in which embodiments of the present invention can be used, FIG. 2 is intended to illustrate an example of EPS architecture (2G/3G case in which embodiments of the present invention can be used, FIG. 3 is intended to illustrate an example of message flow, according to embodiments of the present invention.

By way of example, the description below is made for a mobile system corresponding to 3GPP Evolved Packet System EPS.

Some mobile devices (UE) with high constraints on the duration of the battery (e.g. Machine type devices deployed on the field) go into very long Power Saving Modes (PSM) during which they are not reachable.

Such PSM (Power Saving Mode) is e.g. defined in 3GPP TS 23.682, TS 23.401 § 4.3.22 "UE Power Saving Mode" and TS 23.060 § 5.3.20.

During PSM the UE does not release/lose its IP address.

The serving node of the UE (MME/SGSN) is aware when the UE is in PSM and when the UE leaves the PSM (e.g. when a radio connection has been established with the UE).

When a network application tries to contact (sending an IP packet to) a UE in PSM, the DDN (Downlink Data Notification) process associated with the incoming IP packet from the network application fails and the network application request packet is discarded as indicated in 3GPP 23.401: when the UE is known to be in PSM, "the MME does not page the UE in E-UTRAN coverage and shall send a Downlink Data Notification Reject message to the Serving GW when receiving a Downlink Data Notification message from the Serving GW":

When the DL packet is dropped due to DDN failure the SGW (Serving Gateway) may send an UL ICMP (uplink Internet Control Message Protocol) message indicating "destination unreachable" that warns the network application of the failure.

Downlink access thus raises a number of problems for such devices (also called 3GPP constrained devices in 3GPP document Tdoc 52-142932): e.g. packet discard when the UE sleeps, frequent retransmissions, load on the CN network, waste of radio resources and UE power when the network unnecessarily conveys retransmit packets, etc.

Enhancements to the 3GPP system are needed in particular to solve such problems.

Existing or possible solutions are first recalled or considered below.

The 3GPP has developed a device triggering capability (defined in 3GPP 23.682) allowing a network application to ask the Core Network (EPC as defined in 3GPP 23.401/23.060) to trigger a UE. This capability relies on using the SMS (Short Message Service as defined in 3GPP 23.040) and is thus costly in terms of signaling: Each time a network application needs to trigger an UE, The network application needs to contact an IWF (interworking Function), asking the IWF to send a device trigger request to the UE The IWF contacts the HSS to know the address of the node (MME/SGSN) serving the UE The IWF requests a SMS-SC (as defined in 3GPP 23.040) to deliver the device trigger request that is embedded in a SMS. The delivery of the SMS implies further exchanges of signaling within the network: the SMS delivery request is sent to a serving Node of the UE (e.g. MME), that rejects the SMS delivery because the UE is in PSM, then the SMS delivery request is sent to another serving Node of the UE (e.g. SGSN) that rejects the SMS delivery because the UE is in PSM.

The benefit of this (SMS based) solution is that if there is a failure to deliver the device trigger (SMS), the Serving Node (MME or SGSN) and the HSS store that a SMS is waiting for delivery to the UE (and the HSS stores in a MWD list the identity of the SMS-SC that has just failed to deliver a SMS). Thus at next radio contact, the Serving Node (MME or SGSN) notifies the HSS that the UE has become reachable and the HSS notifies all SMS-SC in the MWD list for the UE that the UE has become reachable again.

As a summary, the existing solution ensures that the network application is notified next time the UE becomes reachable but with the cost of using SMS which is a costly feature in terms of signaling load.

The network application cannot autonomously know when the UE is in PSM, as the timers governing the PSM of the UE are negotiated between the UE and the node (MME/SGSN) serving the UE. Furthermore the UE may leave PSM due to events out of knowledge of a network application e.g. when another application is started by the user on the UE.

Another solution would be for the Core Network to notify the network application when the UE enters and leaves the PSM (UE reachability information). The issues with this kind of solution are The only element in the network that would be able to notify the UE reachability information would be the Serving Node (MME/SGSN) of the UE. Another node does not know when the UE starts or leaves the PSM mode So this notification would be initiated by the Serving Node (MME/SGSN) (in the VPLMN—Visited Public Land Mobile Network) and need to cross a Gateway to the application (in HPLMN—Home Public Land Mobile Network). This would imply a lot of useless signaling between the EPC and the network application as UE triggering by a network application may be a rare event.

It does not guarantee that, when a network application tries (sending an IP packet to the UE) to contact a UE (even not in PSM), the network application request succeeds: it may happen that the UE is in a coverage hole and that UE paging fails.

Another solution would be for the UE to expose its presence onto the application, telling when it is back from PSM. This mechanism would induce a lot of useless signaling between the UE and the network application for devices that only occasionally receive spontaneous requests from a network application.

Therefore, none of the above solutions is satisfying. There is a need for a different approach for the support of mobile-terminated application services in a mobile system, in particular to solve such problems.

Embodiments of the present invention are based on some or all of following principles.

Some UE have a (HSS) subscription "for network application triggering when the UE is available after a DDN failure". In such a case the HSS is pre-configured (by OAM or by other signaling means) with the network application(s) to notify when the UE becomes reachable again after a DDN failure. This subscription is defined on an (UE, APN) basis.

This subscription is associated with (dynamic) "DDN failure" flags that, per (UE, APN) keeps tracks of whether a DDN failure has taken place and network application(s) needs to be notified when the UE becomes reachable again.

For an UE that has such a subscription ("for network application triggering when the UE is available after a DDN failure"), in case there is a failure of a DDN (Downlink Data Notification) procedure (due to UE in PSM or due to paging failure) the Serving Node (MME or SGSN) checks the "DDN failure" flag for the corresponding APN. If this flag was not set, it is set and the HSS is notified that the UE is un-reachable for this APN. The HSS stores this information.

When an UE becomes reachable again (a radio contact has been established with the UE) and the "DDN failure" flag is set, the Serving Node (MME or SGSN) notifies the HSS that the UE is reachable again the Serving Node (MME or SGSN) clears the "DDN failure" flags the HSS notifies the relevant network application(s) that the UE is reachable again The application(s) can re-issue their IP traffic to the UE (sending an IP packet to the UE and triggering again a DDN)

Embodiments of the present invention are now described in more detail as follows (refer to FIGS. 1, 2 for examples of a global architecture, and to FIG. 3 for an example of message flow).

Some or all of following steps may be provided.

0. Some UE have a (HSS) subscription for "network application triggering when the UE is available after a DDN failure" associated with some of their subscribed APN. For each of these APN the HSS is pre-configured (by OAM or by other signaling means) with the address of the network application(s) to notify when the UE becomes reachable again after a DDN failure related with traffic on this APN.

a. The (UE, APN) based subscription "for network application triggering when the UE is available after a DDN failure" may be associated via OAM with one or multiple applications to trigger, Or b. An interface may be defined onto the HSS to allow network applications to dynamically register/unregister to notifications "for network application triggering when the UE is available after a DDN failure".

The feature is managed on an (UE, APN basis) as it may happen that an UE support multiple APN
- One APN (e.g. for M2M/Machine Type service) where this feature is needed
- Another APN (e.g. for IMS or Internet) where this feature does not make sense (in the case of Access to Internet, the application to notify cannot be pre-determined)
- Thus the subscription "for network application triggering when the UE is available after a DDN failure" is defined on a per UE and APN basis.

1. The UE subscription for "network application triggering when the UE is available after a DDN failure" associated with some APN is provided to the Serving Node of the UE (MME/SGSN) as part of the subscription data of the UE.
    - Note: This means an update of the definition of the S6a/S6d interface (3GPP 29.272). This definition update is related with the format of the subscription data, not with the mechanism to keep the subscription data up to date in the MME/SGSN.
    - The subscription data are e.g. provided to the Serving Node of the UE (MME/SGSN) as part of the procedure where the UE issues an ATTACH to the network or issues a TRACKING/ROUTING AREA UPDATE to a new Serving Node (MME/SGSN).
    - When a Serving Node (MME/SGSN) starts serving an UE, the "DDN failure" flag is cleared for all PDN connections of the UE.

Following steps occur when the SGW sends to the MME/SGSN a DDN request corresponding to a PDN connection (towards an APN) and there is a DDN failure and the APN subscription of the UE is associated with subscription for "network application triggering when the UE is available after a DDN failure".

2. The network application sends some request to the UE. As the UE is in IDLE mode, the SGW sends a DDN request to the serving Node of the UE: MME (or SGSN).
3. This DDN fails either due to the UE being in PSM or due to a paging failure (no answer from the UE): the serving Node of the UE (MME or SGSN) rejects the DDN. As the DL packet is dropped due to a DDN failure the SGW may send an UL (Uplink) ICMP message indicating "destination unreachable" that notifies the network application of the failure to deliver its IP packet. This UL ICMP message indicating "destination unreachable" may contain an extra information telling the application that the network will issue a notification when the destination IP address becomes reachable again.
4. If the "DDN failure" flag for the corresponding APN was not set, it is set by the serving Node of the UE and the HSS is notified that the UE is un-reachable for this APN (see Note 1). The HSS sets a local "DDN failure" flag for the corresponding APN and the Serving Node acts as if it had received from the HSS an indication "that the HSS has requested to be notified when the UE has become reachable" (equivalent to the reception of a S6a/S6d ISD message with the IDR flag "UE Reachability Request" set, refer to 3GPP 29.272 Table 7.3.103/1).
    - Note 1: This means an update of the definition of the S6a/S6d interface (3GPP 29.272). For example the "Notify Request" message is modified to support a per APN notification of the "UE being un-reachable".
    - Note 2: the notification to the HSS allows to deal with a failure of the Serving Node of the UE. In case of such failure, the mechanisms of steps 11 and 12 ensure that the subscribed network application(s) ends up being notified.
5. If it was the first APN of the UE for which the "DDN failure" flag has been set and the UE is served by another Serving Node, the HSS requests this other serving Node to be notified when the UE has become reachable.
    - Note: This requests reuses the existing Insert Subscriber Data procedure over S6a/S6d (3GPP 29.272) and does not mean an update of the definition of the S6a/S6d interface
    - Note: This is to deal with the case where, when it comes out of PSM, the UE is served by another Serving Node/RAT (e.g. over 2G and served by a SGSN) than the Serving Node/RAT (e.g. LTE and served by a MME) that had been used when the DDN failure occurred.

These steps (2 to 5) may occur multiple times (when e.g. the application repeats t requests)

Following steps occur when MME (or SGSN) detects a radio contact with the UE (e.g. after an UE initiated SERVICE REQUEST or a TRACKING AREA UPDATE REQUEST or a ROUTING AREA UPDATE REQUEST or after the success of a DDN procedure) and the "DDN failure" flag is set for some active PDN connections of the UE.

6. A radio contact is established with the UE while the "DDN failure" flag is set for some active PDN connections of the UE
7. The Serving Node (MME or SGSN) notifies the HSS that the UE is reachable again.
    - Note: This may reuse the existing definition of the NOR message defined on the S6a/S6d interface (3GPP 29.272). Actually it may reuse the NOR-Flags

| | | |
|---|---|---|
| 3 | Reachable from MME | This bit, when set, shalt indicate that the UE has become reachable again from MME. |
| 5 | Reachable from SGSN | This bit, when set, shall indicate that the UE has become reachable again from SGSN. |

8. The Serving Node (MME or SGSN) clears the "DDN failure" flags of the UE
9. For each of the APN associated with a "DDN failure" flag indicated as set in its data, the HSS issues a notification that the UE is reachable again towards the network application(s) associated with the APN subscription for "network application triggering when the UE is available after a DDN failure". Then the HSS clears all the "DON failure" flag associated with the UE in its local data.
10. The network application can re-issue their request to the UE (sending an IP packet to the UE and triggering again a DDN). As the UE is no more in PSM (the UE is likely to still be CONNECTED), the packet is successfully delivered to the UE Following steps occur when the HSS receives an S6a/S6d UPDATE location from a Serving Node about an UE. The HSS interprets the S6a/S6d UPDATE location as an indication of a successful radio contact with this UE and thus following 2 steps apply:

11. (same as step 9).
12. (same as step 10).

Note: the entities handling the User plane traffic of the UE (SGW/PGW) are not modified by embodiments of this invention. The UE is not modified by embodiments of this invention (which is a benefit as it means no dependency on the provider of the M2M device)

Only one notification related with the APN is sent to the HSS when multiple PDN connections to the same APN are established for an UE.

Note: As the DDN procedure may not be activated in some cases (loss of the IP packet between the network application and SGW, congestion at the MME/SGSN that has triggered a DDN throttling enforced by the SGW, . . . ) the mechanism described in this document does not remove the need for the network application to periodically attempt to re-contact the UE. The mechanism nevertheless ensures that if the application attempts to re-contact the UE, and the "DDN failure" flag was not already set in the MME/SGSN, the procedures described above in steps 2-5 apply and the "DDN failure" flag was already set in the MME/SGSN, there is no extra signaling in the network Embodiments of the present invention allow an application to contact a device even though this device actives long duration Power Saving (becomes not reachable for a long time). It saves network signaling resource with regard to the existing SMS based solution and does not require to notify the application each time such UE becomes reachable.

In one aspect, there is provided a method for support of mobile-terminated application services in a mobile system.

In an embodiment, said method comprises:
based on a User Equipment UE subscription, enabling, for one or more subscribed Access Point Name APN, triggering of at least one network Application associated with a given of said one or more APN, upon said UE being reachable again after failure of a mobile network procedure to reach said UE via a Packet Data Network PDN connection established for said UE and said APN (such as after Downlink Data Notification failure in an EPS network).

In an embodiment, said method comprises:
a mobile network subscriber database such as Home Subscriber Server HSS storing data associated with said UE subscription for said triggering.

In an embodiment, said method comprises:
a mobile network subscriber database such as Home Subscriber Server HSS providing data associated with said UE subscription for said triggering, to a mobile Core Network node capable of serving said UE, such as Mobility Management Entity MME or Serving GPRS Support Node SGSN.

In an embodiment, said method comprises:
a mobile network subscriber database such as Home Subscriber Server HSS receiving from a mobile Core Network node capable of serving said UE, such as Mobility Management Entity MME or Serving GPRS Support Node SGSN serving said UE, a notification that a failure to reach said UE has occurred on a given of said one or more APN.

In an embodiment, said method comprises:
a mobile network subscriber database such as Home Subscriber Server HSS storing a flag associated with said UE subscription for said triggering, said flag keeping track of whether a failure to reach said UE has occurred on a given of said one or more APN and said at least one associated network Application needs to be triggered upon said UE being reachable again.

In an embodiment, said method comprises:
a mobile network subscriber database such as Home Subscriber Server HSS receiving from a mobile Core Network node capable of serving said UE, such as Mobility Management Entity MME or Serving GPRS Support Node SGSN, a notification of said UE being reachable again.

In an embodiment, said method comprises:
a mobile network subscriber database such as Home Subscriber Server HSS sending, for each of said one or more APN, associated with a flag keeping track of whether a failure to reach said UE has occurred on this APN, a notification towards said at least one associated network. Application upon said UE being reachable again, and clearing said flag.

In an embodiment, said method comprises:
a mobile Core Network node capable of serving said UE, such as Mobility Management Entity MME or Serving GPRS Support Node SGSN, receiving, from a mobile network subscriber database such as Home Subscriber Server HSS, data associated with said UE subscription for said triggering.

In an embodiment, said method comprises:
a mobile Core Network node capable of serving said UE, such as Mobility Management Entity MME or Serving GPRS Support Node SGSN, sending to a mobile network node subscriber database such as Home Subscriber Server HSS a notification that a failure to reach said UE has occurred.

In an embodiment, said method comprises:
a mobile Core Network node capable of serving said UE, such as Mobility Management Entity MME or Serving GPRS Support Node SGSN, sending to a mobile network node subscriber database such as Home Subscriber Server HSS, a notification that said UE is reachable again.

In an embodiment, said method comprises:
a mobile Core Network node capable of serving said UE, such as Mobility Management Entity MME or Serving GPRS Support Node SGSN, storing a flag associated with said UE subscription for said triggering and with a given of said one or more APN, said flag keeping track of whether a failure to reach said UE on this APN has occurred.

In on embodiment, said method comprises:
a mobile Core Network node capable of serving said UE, such as Mobility Management Entity MME or Serving GPRS Support Node SGSN, upon starting to serve said UE, clearing, for each PDN connection of the UE associated with a given of said one or more APN, a flag keeping track of whether a failure to reach said UE has occurred.

In an embodiment, said method comprises:
a mobile Core Network node capable of serving said UE, such as Mobility Management Entity MME or Serving GPRS Support Node SGSN, upon failure to reach said UE on a given of said one or more APN, checking if a flag keeping track of whether a failure to reach said UE on this APN has occurred is set, and if this flag was not set, sending to a mobile network node subscriber database such as Home Subscriber Server HSS a notification that a failure to reach said UE has occurred on this APN and setting this flag in order not to repeat this notification as long as the flag associated with this UE and APN has not been cleared.

In an embodiment, said method comprises:
a mobile Core Network node capable of serving said UE, such as Mobility Management Entity MME or Serving GPRS Support Node SGSN, upon said UE being reachable again, clearing each flag associated with the UE and with a given of said one or more APN keeping track of whether a failure to reach said UE has occurred on the APN.

In an embodiment, said method comprises:
a network Application registering, or unregistering, to notifications from a mobile network subscriber database such as Home Subscriber Server HSS, for said triggering.

In an embodiment, said method comprises:
an Operation And Maintenance OAM entity configuring a mobile network subscriber database such as Home Subscriber Server HSS with subscription data associated with said UE subscription.

In other aspects, entities configured for performing at least one of the steps of such method are provided, said entities including, in particular (though not exclusively): mobile network subscriber database (such as Home Subscriber Server HSS), mobile Core Network nodes capable of serving an User Equipment UE in a mobile network (such as Mobility Management Entity MME or Serving GPRS Support Node SGSN), network Application, Operation and Maintenance (OAM) entity.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus, comprising:
at least one processor; and
at least one memory including computer program code;
the at least one memory and the computer program code configured to, with the at least one processor, cause the apparatus at least to perform:
determine if a downlink data notification failure associated with a downlink data delivery failure occurs for a user equipment,
determine if information associated with a subscription for notifying a network application when the user equipment is available after a downlink data notification failure has been received,
if said downlink data notification failure occurs and said information has been received, determine if the user equipment becomes reachable after said downlink data notification failure, and
if the user equipment becomes reachable after said downlink data notification failure, send a notification indicating that the user equipment is available after said downlink data notification failure.

2. The apparatus according to claim 1, wherein the at least one memory and the computer program code are configured to, with the at least one processor, cause the apparatus to perform:
receive said information from a mobile network subscriber database.

3. The apparatus according to 1, wherein the at least one memory and the computer program code are configured to, with the at least one processor, cause the apparatus to perform:
if said information has been received, set a flag, referred to as a downlink data notification failure flag, in case of downlink data notification failure.

4. The apparatus according to claim 1, wherein the at least one memory and the computer program code are configured to, with the at least one processor, cause the apparatus to perform:
if a downlink data notification failure flag has been set after a downlink data notification failure, and if the user equipment becomes reachable, send a notification indicating that the user equipment is available after said downlink data notification failure, and clear the downlink data notification failure flag.

5. The apparatus according to claim 1, wherein:
said user equipment is a user equipment using a power saving mode.

6. The apparatus according to claim 1, wherein the at least one memory and the computer program code are configured to, with the at least one processor, cause the apparatus to perform:
receive said information as part of subscription data of the user equipment.

7. The apparatus according to claim 1, wherein:
said apparatus comprises a mobility management entity.

8. A method comprising:
determining if a downlink data notification failure associated with a downlink data delivery failure occurs for a user equipment,
determining if information associated with a subscription for notifying a network application when the user equipment is available after a downlink data notification failure has been received,
if said downlink data notification failure occurs and said information has been received, determining if the user equipment becomes reachable after said downlink data notification failure, and
if the user equipment becomes reachable after said downlink data notification failure, sending a notification indicating that the user equipment is available after said downlink data notification failure.

9. The method according to claim 8, comprising:
if said information has been received, setting a flag, referred to as downlink data notification failure flag, in case of downlink data notification failure.

10. The method according to claim 8, comprising:
if a downlink data notification failure flag has been set after a downlink data notification failure, and if the user equipment becomes reachable, sending a notification indicating that the user equipment is available after said downlink data notification failure, and clearing the downlink data notification failure flag.

11. The method according to claim 8, comprising:
receiving said information from a mobile network subscriber database.

12. The method according to claim 8, comprising:
receiving said information as part of subscription data of the user equipment.

13. The method according to claim 8, wherein:
said user equipment is a user equipment using a power saving mode.

14. The method according to claim 8, wherein:
said method is performed by a mobility management entity.

\* \* \* \* \*